US009531219B2

(12) United States Patent
Nam

(10) Patent No.: US 9,531,219 B2
(45) Date of Patent: Dec. 27, 2016

(54) NON-CONTACT POWER FEEDING APPARATUS USING CONDUCTIVE FLUID

(75) Inventor: Seong Won Nam, Gyeonggi-do (KR)

(73) Assignee: KOREA RAILROAD RESEARCH INSTITUTE, Gyeonggi-do (KR)

( * ) Notice: Subject to any disclaimer, the term of this patent is extended or adjusted under 35 U.S.C. 154(b) by 285 days.

(21) Appl. No.: 14/347,727

(22) PCT Filed: Dec. 15, 2011

(86) PCT No.: PCT/KR2011/009676
§ 371 (c)(1),
(2), (4) Date: Mar. 27, 2014

(87) PCT Pub. No.: WO2013/054981
PCT Pub. Date: Apr. 18, 2013

(65) Prior Publication Data
US 2014/0216878 A1    Aug. 7, 2014

(30) Foreign Application Priority Data

Oct. 13, 2011  (KR) .................. 10-2011-0104880

(51) Int. Cl.
*B60L 5/00* (2006.01)
*H02J 17/00* (2006.01)

(52) U.S. Cl.
CPC .................. *H02J 17/00* (2013.01); *B60L 5/00* (2013.01); *B60L 5/005* (2013.01); *B60L 2200/26* (2013.01)

(58) Field of Classification Search
CPC .................................. B60L 5/00; B60L 5/005
(Continued)

(56) References Cited

U.S. PATENT DOCUMENTS 3,874,305 A * 4/1975 Sema .................. B60T 7/12
  105/26.05
8,596,434 B2 * 12/2013 Kitanaka .............. B60L 5/28
  105/50

FOREIGN PATENT DOCUMENTS

GB      1229584   *  4/1971   .............. B60L 5/005
JP     62-100102      5/1987
(Continued)

OTHER PUBLICATIONS

Office Action dated Sep. 1, 2015 corresponding to Chinese Application No. 201180073969.6 with English translation, 15 pages.
(Continued)

*Primary Examiner* — Zachary Kuhfuss

(57) ABSTRACT

Disclosed is a non-contact power feeding apparatus using a conductive fluid, through which an electric railroad vehicle or a trolleybus receives required power from a contact wire in a non-contact state by using the conductive fluid. The non-contact power feeding apparatus according to the present invention includes: a fluid injection hole defined in a vehicle to inject the conductive fluid toward the contact wire; a conductive fluid container for supplying the conductive fluid that is injected through the fluid injection hole; a pressing pump for injecting the conductive fluid within the conductive fluid container through the fluid injection hole; and a current collection terminal disposed on a side of the fluid injection hole to receive the power from the contact wire in a non-contact manner by using the conductive fluid as a medium. According to the present invention, since the conductive fluid is injected toward the contact wire through the fluid injection hole to feed the power in a non-contact manner, wear-out of the power feeding apparatus and the contact wire does not occur and thus costs for maintenance and repair can be reduced.

14 Claims, 1 Drawing Sheet

(58) Field of Classification Search
USPC .............................................. 191/1 R, 22 R
See application file for complete search history.

(56) References Cited

FOREIGN PATENT DOCUMENTS

| | | |
|---|---|---|
| JP | 2001-197603 | 7/2001 |
| JP | 2005-324189 | 11/2005 |
| JP | 2008-079428 | 4/2008 |
| KR | 10-2005-0027005 | 3/2005 |

OTHER PUBLICATIONS

International Search Report mailed Sep. 28, 2012 for PCT/KR2011/009676.
Written Opinion of the International Search Report mailed Sep. 28, 2012 for PCT/KR2011/009676.

* cited by examiner

NON-CONTACT POWER FEEDING APPARATUS USING CONDUCTIVE FLUID

This application claims the priority of Korean Patent Application No. 10-2011-0104880, filed on Oct. 13, 2011 in the KIPO (Korean Intellectual Property Office), the disclosure of which is incorporated herein entirely by reference. Further, this application is the National Stage application of International Application No. PCT/KR2011/009676, filed Dec. 15, 2011, which designates the United States and was published in Korean. Each of these applications is hereby incorporated by reference in their entirety into the present application.

TECHNICAL FIELD

The present invention relates to a non-contact power feeding apparatus using a conductive fluid, and more particularly, to a non-contact power feeding apparatus using a conductive fluid, through which an electric railroad vehicle or a trolleybus receives required power from a contact wire in a non-contact state by means of the conductive fluid.

BACKGROUND ART

Recently, due to limitation of land transportation caused by the rapid increase of automobiles and severe congestion of road transportation, demands for electric railways are increasing day by day.

Meanwhile, according to the supply expansion to meet the increasing demand for electric railways, there is a pressing need for securing the safety and reliability of the electric railway as massive public transportation means.

The vehicle of the electric railway receives electric energy of AC 25,000V or DC 1,500V required as the operating power from a contact wire (also called as a 'trolley wire') installed along the track of the railway and this electric energy is utilized to operate and control the vehicle. To this end, a pantograph for collecting the power is installed on the vehicle.

As shown in FIG. 1, the conventional electric railroad vehicle 1 or trolleybus is configured such that a pantograph 20 is in direct contact with a contact wire to feed with the power required for the vehicle into the vehicle.

However, since the contact wire 10 and the pantograph 20 are in contact with each other, a power collecting plate (contact strip) of the pantograph 20 and the contact wire 10 may be worn out. Therefore, it is necessary to periodically maintain and repair the power collecting plate of the pantograph 20 and the contact wire 10.

In addition, in order to prevent a contact wire from being separated from the pantograph, it is necessary to accurately control the pantograph 20 to maintain a constant uplift force. In particular, at a high-speed driving time, it is quite difficult to attain a uniform uplift force, which may hinder speed improvement of a high speed train and may lead to an environmental problem, such as an aerodynamic noise.

DISCLOSURE OF THE INVENTION

Technical Problem

The present invention has been made in an effort to solve the problems of the prior art, and it is an object of the present invention to provide a non-contact power feeding apparatus using a conductive fluid, through which an electric railroad vehicle or a trolleybus receives required power from a contact wire in a non-contact state by using the conductive fluid, thereby facilitating maintenance and repair of the non-contact power feeding apparatus and obviating an environmental problem, such as an aerodynamic noise.

Technical Solution

In accordance with an aspect of the present invention, the above and other objects can be accomplished by providing a non-contact power feeding apparatus including a fluid injection hole installed on a vehicle to inject conductive fluid toward a contact wire, a conductive fluid container for supplying the conductive to be injected through the fluid injection hole, a pressing pump for injecting the conductive fluid within the conductive fluid container through the fluid injection hole, and a current collection terminal disposed on a side of the fluid injection hole to receive the power from the contact wire in a non-contact manner through the conductive fluid as a medium.

The fluid injection hole, the conductive fluid container and the pressing pump may be installed on a main body, and the main body may be installed at an upper portion of a vehicle.

In particular, one or more of the fluid injection hole may be formed on the main body.

The vehicle may be an electric railroad vehicle or a trolleybus.

In addition, the pump may be driven by a control signal of a controlling means.

Here, the controlling means may be a train controller installed in the vehicle to control the traffic of the vehicle.

The conductive fluid may be one of plasma and an ionized fluid.

In accordance with another aspect of the present invention, the above and other objects can be accomplished by providing a non-contact power feeding apparatus including a fluid injection hole installed on a vehicle to inject the conductive fluid toward a contact wire, a conductive fluid container for supplying the conductive fluid to be injected through the fluid injection hole, and a current collection terminal disposed on a side of the fluid injection hole to receive the power from the contact wire in a non-contact manner through the conductive fluid as a medium.

Advantageous Effects

As described above, according to the present invention, since the conductive fluid is injected toward the contact wire through the fluid injection hole to feed the power in a non-contact manner, wear-out of the power feeding apparatus and the contact wire does not occur and thus costs for maintenance and repair can be reduced.

In a case of a contact-type pantograph, it is necessary to elaborately control the pantograph to maintain an uplift force at a constant level for stably feeding the power, making the apparatus complicated. However, since the power feeding apparatus according to the present invention feeds power in a non-contact manner, there is no need to perform a controlling process for maintaining the uplift force, a separation of the contact wire from the power feeding apparatus, which causes the arc and the like, can be solved through the non-contact manner and the electric equipment provided in the vehicle may also be protected.

MODE FOR CARRYING OUT THE INVENTION

Hereinafter, features of a non-contact power feeding apparatus using a conductive fluid according to the present invention will be understood through a detailed description of the embodiment of the present invention with reference to the accompanying drawings.

Figure 1:
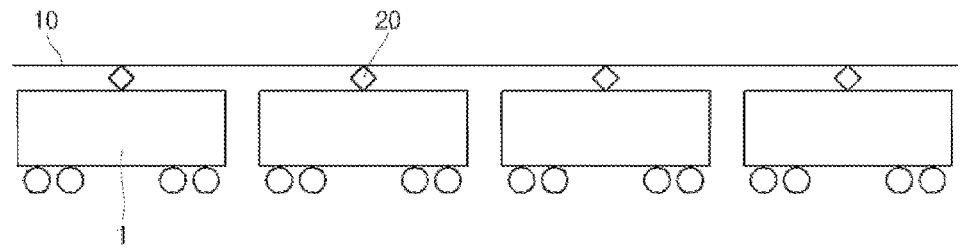
FIG. 1 is a view showing an example of a power feeding method using a conventional pantograph.
Figure 2:
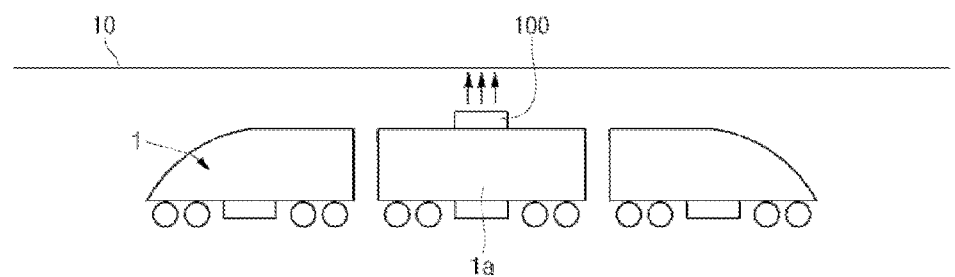
FIG. 2 is a view illustrating a vehicle provided with a non-contact power feeding apparatus using a conductive fluid according to the present invention.
Figure 3:
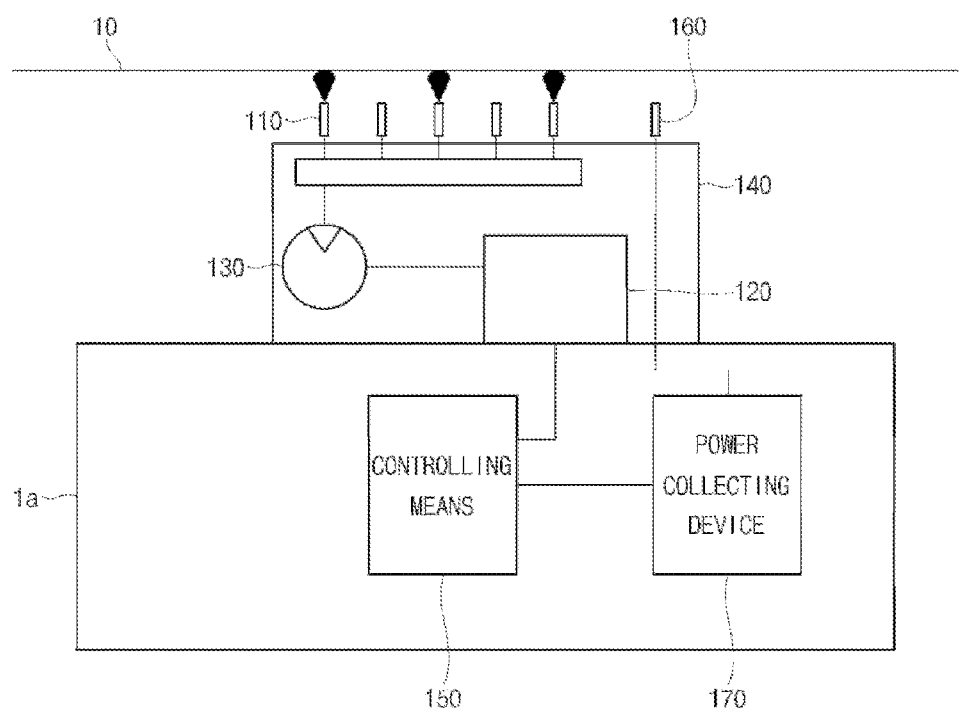
FIG. 3 is a view showing a structure of the non-contact power feeding apparatus using a conductive fluid according to the present invention.

Referring to FIGS. 2 and 3, a non-contact power feeding apparatus 100 using a conductive fluid according to the present invention is installed on a vehicle 1a, such as an electric railroad vehicle 1 or a trolleybus and receives the power required for driving the vehicle 1a from a contact wire 10 in a non-contact manner.

The non-contact power feeding apparatus 100 using a conductive fluid according to the present invention includes a fluid injection hole 110 provided on the vehicle 1a to inject the conductive fluid toward the contact wire 10, a conductive fluid container 120 for supplying the conductive fluid that is injected through the fluid injection hole 110, a pressing pump 130 for injecting the conductive fluid within the conductive fluid container 120 through the fluid injection hole 110.

Here, the fluid injection hole 110, the conductive fluid container 120 and the pressing pump 130 are installed in a main body 140 having a predetermined size, and the main body 140 is integrally and fixedly mounted to a top portion of the vehicle 1a, such as the electric railroad vehicle 1 or the trolleybus.

The pressing pump 130 is driven by a control signal of a controlling means 150 to discharge the conductive fluid contained in the conductive fluid container 120 to the fluid injection hole 110.

Meanwhile, at least one fluid injection hole 110 is formed on the main body 140 to inject the conductive fluid toward the contact wire 10.

At this time, a power collecting terminal 160 is installed at a side of the fluid injection hole 110 so as to be maintained at a predetermined distance (for example, 3 to 5 cm) to receive the power from the contact wire 10.

Therefore, when the conductive fluid is injected toward the contact wire 10, power is supplied to the power collecting terminal 160 via the conductive fluid acting as a medium and is then fed to a power collecting device 170 of the vehicle 1a.

Meanwhile, a vehicle controller provided in the vehicle 1a for controlling a driving of the vehicle is utilized as the controlling means 150 for controlling an operation of the pressing pump 130.

In other words, since instead of the conventional pantograph, the non-contact power feeding apparatus 100 for injecting the conductive fluid to the vehicle 1a is mounted and the conductive fluid is injected toward the contact wire 10 to feed power, the non-contact power feeding apparatus 100 using a conductive fluid according to the present invention keeps the contact line at an appropriate distance and receives the power from the contact line in a non-contact manner without occurring a contact between the contact wire and the power feeding apparatus.

At this time, the conductive fluid used as the medium for collecting the electricity flowing through the contact wire 10 to the power collecting device 170 of the vehicle 1a includes plasma or ionized fluid.

Meanwhile, if the aforementioned non-contact power feeding apparatus 100 is employed, the contact wire 10 for supplying power can be variously modified and designed and it is possible to adopt the configuration in which the contact wire 10 is buried in the ground.

Hereinafter, a process for feeding the power using the non-contact power feeding apparatus using the conductive fluid according to the present invention is illustrated.

In order to drive the electric railroad vehicle 1 or the trolleybus, the train controller acting as the controlling means 150 of the non-contact power feeding apparatus 100 installed in the vehicle 1a operates the pressing pump 130 to inject the liquid-phased conductive fluid toward the contact wire 10 through the fluid injection hole 110.

At this time, the conductive fluid such as plasma is ejected by a discharge of positive (+) and negative (−) electrodes without the pressing pump 130.

Due to the above, the power is supplied to the power collecting terminal 160 through the conductive fluid as a medium and is then collected in the power collecting device 170 installed in the vehicle 1a.

And, the train controller acting as the controlling means 150 utilizes the power which is fed for driving the vehicle, to control a driving of the vehicle 1a.

As described above, since the conductive fluid is injected toward the contact wire 10 through the fluid injection hole 110 and the power collecting terminal 160 is not in directly contact with the contact wire 10 when the power is collected through the conductive fluid as the medium, the wear-out problem occurred in the contact wire 10 and the contact type power collecting device such as the conventional pantograph is not generated so that it is possible to reduce a maintenance expense for the contact wire.

In addition, the non-contact structure can solve a problem of separation of the contact wire from the pantograph, which causes an electrical arc and the like, and electric equipments provided in the vehicle 1a can be protected.

Although the preferred embodiments of the present invention have been described, the present invention is not limited to the above embodiment, those skilled in the art will readily appreciate that many modifications and variations can be made, without departing from the spirit and scope of the invention as defined in the appended claims, and such modifications and variations are encompassed within the scope and spirit of the present invention.

The invention claimed is:

1. A non-contact power feeding apparatus comprising:
    a fluid injection hole provided on a vehicle to inject conductive fluid toward a contact wire;
    a conductive fluid container for supplying the conductive fluid to be injected through the fluid injection hole;
    a pressing pump for injecting the conductive fluid within the conductive fluid container through the fluid injection hole; and
    a power collecting terminal disposed on a side of the fluid injection hole and placed out of the conductive fluid container to receive the power from the contact wire in a non-contact manner through the conductive fluid as a medium.

2. The non-contact power feeding apparatus of claim 1, wherein the fluid injection hole, the conductive fluid container and the pressing pump are installed on a main body and the main body is installed on an upper portion of the vehicle.

3. The non-contact power feeding apparatus of claim 2, wherein one or more of the fluid injection holes are formed on the main body.

4. The non-contact power feeding apparatus of claim 1, wherein the vehicle is an electric railroad vehicle.

5. The non-contact power feeding apparatus of claim 1, wherein the vehicle is a trolleybus.

6. The non-contact power feeding apparatus of claim 1, wherein the pump is operated by a control signal of a controlling means.

7. The non-contact power feeding apparatus of claim 6, wherein the controlling means is a train controller installed in the vehicle to control a drive of the vehicle.

8. The non-contact power feeding apparatus of claim 1, wherein the power received in the power collecting terminal is then fed to a power collecting device installed in the vehicle.

9. A non-contact power feeding apparatus comprising:
   a fluid injection hole installed on a vehicle to inject conductive fluid toward a contact wire;
   a conductive fluid container for supplying the conductive fluid to be injected through the fluid injection hole; and
   a power collecting terminal disposed on a side of the fluid injection hole and placed out of the conductive fluid container to receive the power from the contact wire in a non-contact manner through the conductive fluid as a medium.

10. The non-contact power feeding apparatus of claim 9, wherein the fluid injection hole and the conductive fluid container are installed on a main body and the main body is installed on an upper portion of the vehicle.

11. The non-contact power feeding apparatus of claim 10, wherein one or more of the fluid injection holes are formed on the main body.

12. The non-contact power feeding apparatus of claim 9, wherein the vehicle is an electric railroad vehicle.

13. The non-contact power feeding apparatus of claim 9, wherein the vehicle is a trolleybus.

14. The non-contact power feeding apparatus of claim 9, wherein the power received in the power collecting terminal is then fed to a power collecting device installed in the vehicle.

* * * * *